(12) United States Patent
Fuss et al.

(10) Patent No.: US 9,631,137 B2
(45) Date of Patent: Apr. 25, 2017

(54) CERAMIC PARTICLES AND PROCESS FOR MAKING THE SAME

(71) Applicant: Saint-Gobain Ceramics & Plastics, Inc., Worcester, MA (US)

(72) Inventors: Tihana Fuss, Stow, OH (US); Kevin R. Dickson, Little Rock, AR (US); Walter T. Stephens, Cleveland, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 476 days.

(21) Appl. No.: 14/142,779

(22) Filed: Dec. 28, 2013

(65) Prior Publication Data

US 2016/0160120 A1 Jun. 9, 2016

Related U.S. Application Data

(60) Provisional application No. 61/747,083, filed on Dec. 28, 2012.

(51) Int. Cl.
  *C09K 8/80* (2006.01)
  *C04B 35/10* (2006.01)
  *C04B 35/18* (2006.01)
  *C04B 35/195* (2006.01)

(52) U.S. Cl.
  CPC .............. *C09K 8/80* (2013.01); *C04B 35/195* (2013.01); *C04B 2235/321* (2013.01); *C04B 2235/3208* (2013.01); *C04B 2235/3272* (2013.01); *C04B 2235/656* (2013.01); *C04B 2235/77* (2013.01); *C04B 2235/80* (2013.01)

(58) Field of Classification Search
  CPC .......... C09K 8/80; C04B 35/195; C04B 35/10
  See application file for complete search history.

(56) References Cited

U.S. PATENT DOCUMENTS

| | | | |
|---|---|---|---|
| 9,382,468 B2 * | 7/2016 | Usova | ..................... C04B 33/04 |
| 2003/0148893 A1 | 8/2003 | Lunghofer et al. | |
| 2008/0182765 A1 | 7/2008 | Pershikova et al. | |
| 2012/0241157 A1 | 9/2012 | Pope et al. | |
| 2012/0277130 A1 * | 11/2012 | Usova | ..................... C04B 33/04 |
| | | | 507/269 |

FOREIGN PATENT DOCUMENTS

| | | | |
|---|---|---|---|
| JP | 2012236730 | * | 12/2012 |
| WO | 2011081545 A1 | | 7/2011 |

OTHER PUBLICATIONS

Weaver, J., et al, A study of proppant-formation reactions, 2009 SPE International Symposium on Oilfield Chemistry Held in Woodlands, TX USA Apr. 20-22, 2009, pp. 1-16. See whole document, especially pp. 4-13.
International Search Report for PCT/US2013/078146.
Written Opinion of the International Search Authority for PCT/US2013/078146.

* cited by examiner

*Primary Examiner* — Karl Group
(74) *Attorney, Agent, or Firm* — Stewart A. Fraser

(57) ABSTRACT

A proppant for use in fracturing geological formations is made from bauxitic ores and a calcium containing compound. The proppant has a calcium containing crystalline phase.

38 Claims, 3 Drawing Sheets

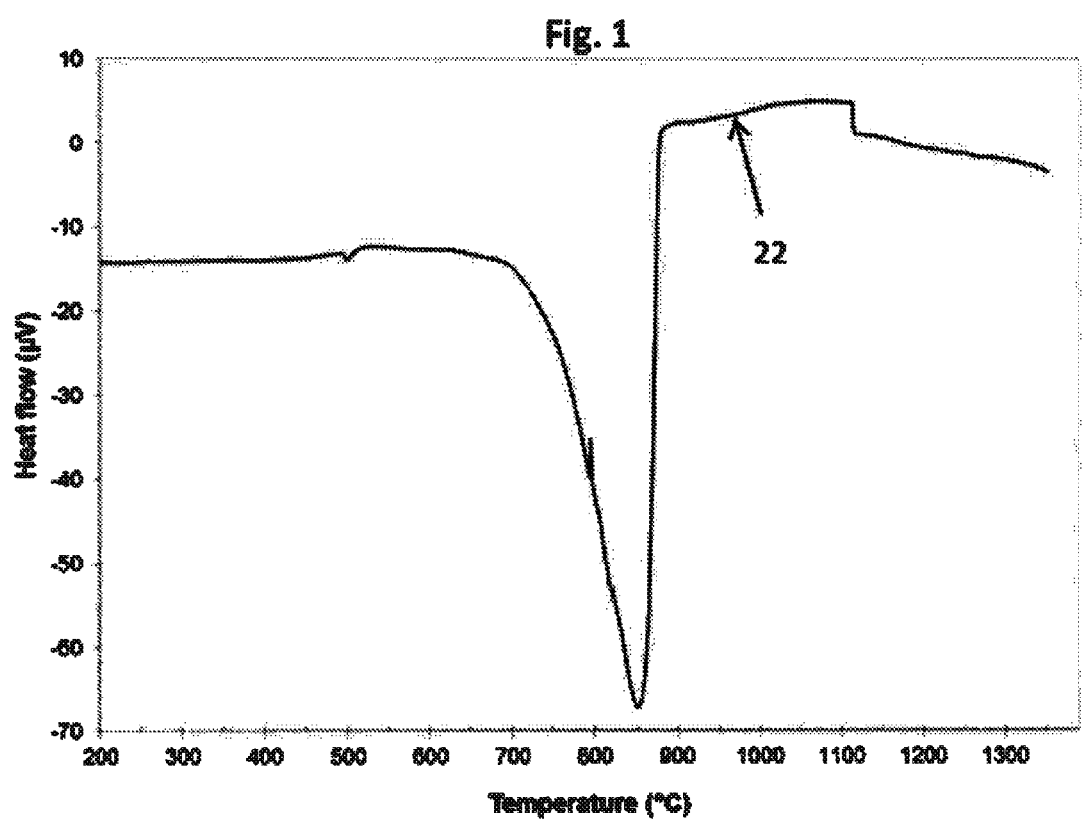

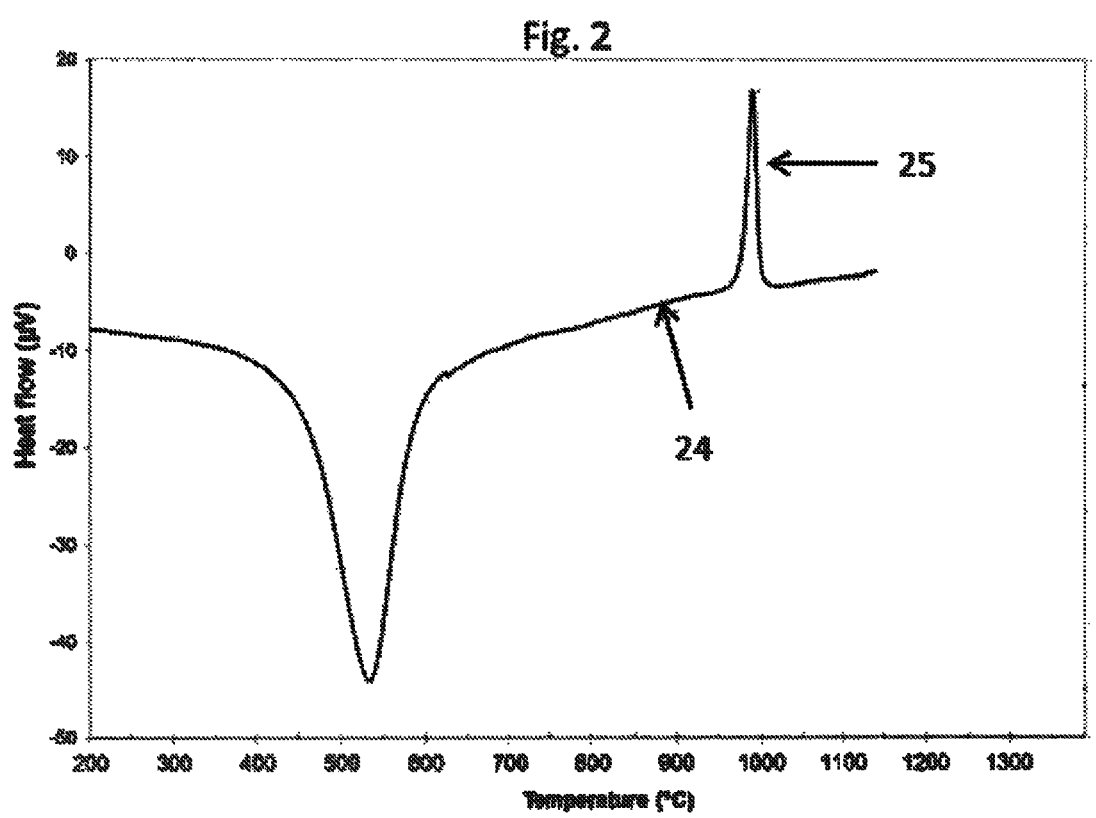

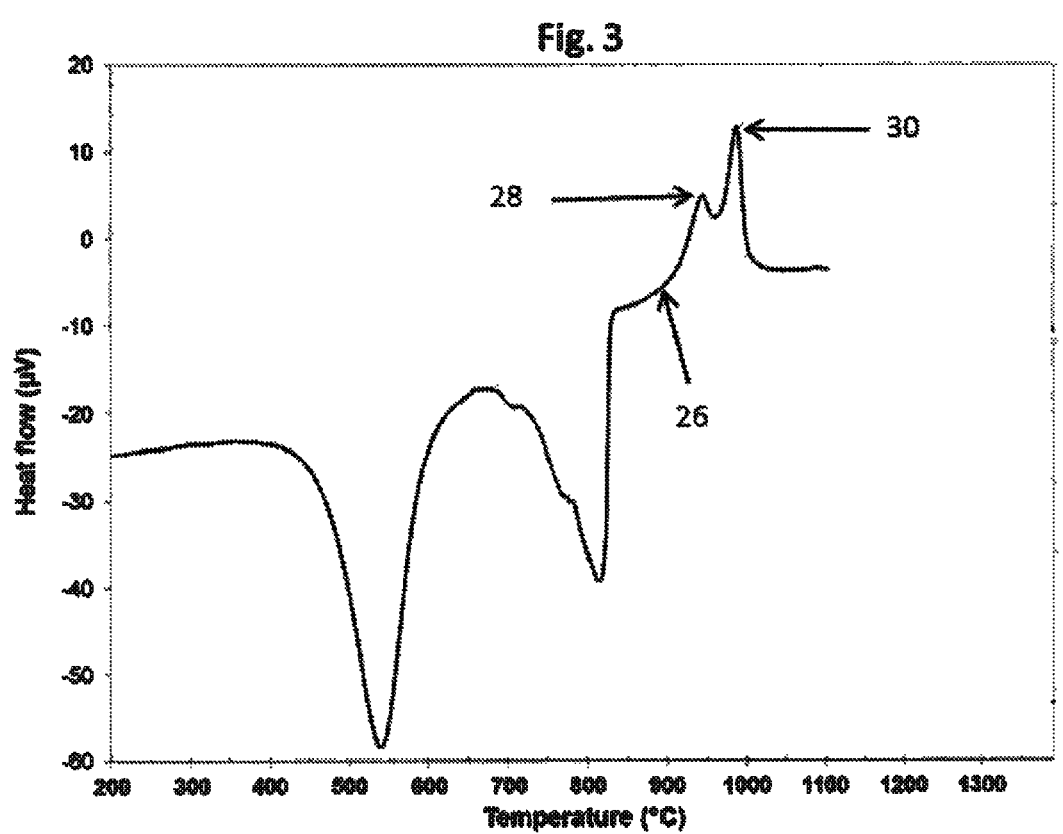

CERAMIC PARTICLES AND PROCESS FOR MAKING THE SAME

CROSS-REFERENCE TO RELATED APPLICATION

This application claims the benefit of U.S. Provisional Application No. 61/747,083 filed Dec. 28, 2012.

BACKGROUND OF THE INVENTION

This invention generally relates to ceramic particles that are useful in applications where high strength and low specific gravity are desirable. More specifically, this invention is concerned with ceramic proppants that may be used to increase the efficiency of wells used to remove fluids from geological formations.

The chemical and physical characteristics of proppants have been disclosed in numerous patents and patent applications including: U.S. Pat. No. 4,632,876; U.S. Pat. No. 7,067,445; US 2006/0177661; US 2008/0223574 and US 2011/0265995. Proppants may generally be classified as made from naturally occurring materials, such as sand, or manufactured materials that have been made by blending solids and liquids to form a mixture which is then formed into a plurality of small spherical particles. The particles are then heated to form sintered ceramic particles.

SUMMARY

Embodiments of the present invention provide for strong sintered ceramic particles that have a low specific gravity and are made by blending an aluminosilicate compound with a calcium containing compound. The sintered particle's chemical composition includes a calcium containing compound that has a crystalline microstructure.

In one embodiment, the present invention is a proppant for use in fracturing geological formations. The proppant comprises between 25 and 75 weight percent $Al_2O_3$, between 0 and 70 weight percent $SiO_2$ and at least 3 weight percent CaO. All percentages are determined by x-ray fluorescence. The proppant also has at least 5 weight percent of calcium containing crystalline phase as determined by x-ray diffraction with an internal standard.

In another embodiment, this invention is directed to a process, for manufacturing a plurality of aluminosilicate particles, comprising the following steps. Providing a first compound comprising 25 to 90 weight percent $Al_2O_3$. Providing a second compound comprising at least 10 weight percent CaO. Mixing the first compound with the second compound in a weight ratio between 10:1 and 1:2 thereby forming a mixture. Forming the mixture into a plurality of non-sintered aluminosilicate particles with the second compound uniformly distributed within the particles and the particles having a digital thermal analysis that exhibits a double exothermal peak between 800° C. and 1100° C.

BRIEF DESCRIPTION OF THE DRAWINGS

FIG. 1 is a graph of a differential thermal analysis of dolomite;

FIG. 2 is a graph of a differential thermal analysis of low bauxitic ore; and

FIG. 3 is a graph of a differential thermal analysis of a mixture of low bauxitic ore and dolomite.

DETAILED DESCRIPTION

Manufacturers of sintered ceramic proppants need to address and resolve several interrelated issues in order to manufacture a commercially viable product. These issues span the proppant's life cycle which can be generally described as beginning when the primary raw material, such as bauxite, is dug from a mine. The primary raw material is combined with secondary raw materials, such as other solids and liquids, to form spherical particles that are then sintered. The sintered particles, which may be referred to herein as proppants, are then mixed with a fluid to form a slurry and forcefully injected through a well bore and into fissures in the earth. The proppants increase the permeability of the geological formation to the flow of fluids therethrough. The proppant's life cycle ends when the well is no longer productive and there no longer exists a need for the sintered particles to function as a proppant. Each stage in the proppant's life cycle imposes limitations on the equipment and processes used to manufacture and then use the proppant. To be successful, the raw materials selected and the processes used to make the proppant and the performance of the proppant must be coordinated to increase the permeability of the geological formation in a safe and efficient manner.

For a proppant to be economically viable, its primary raw material should be both plentiful and inexpensive. The primary raw material should include a minimum amount of alumina which can provide the crush resistance of the proppant. "Crush resistance" is a term commonly used to denote the strength of a proppant and may be determined using ISO 13503-2:2006(E). A strong proppant generates a lower weight percent crush resistance than a weak proppant. For example, a proppant that has a 2 weight percent crush resistance is considered to be a strong proppant and is preferred to a weak proppant that has a 10 weight percent crush resistance. In addition to achieving a low crush resistance, the raw material must minimize, and preferably avoid, the generation of hazardous compounds, such as cistobalite, during any part of the manufacturing process. Furthermore, the raw material must be compatible with liquids, commonly known as fracturing fluids, that are mixed with the proppants to form a slurry which is injected under pressure into a well bore. The fluids may include a wide variety of acids, bases and one or more thickening agents. Consequently, the primary raw material must be compatible and preferably inert with the wide range of liquids and solids that it will contact during the life cycle. The need to address all or even most of these issues limits the selection of primary and secondary raw materials that are available on a commercial scale.

In conventional sintered proppants, there is a well-established relationship between the proppant's specific gravity and the proppant's crush resistance. Ideally, proppant manufacturers want to make proppants highly resistant to crushing while reducing the proppant's specific gravity to approximately 1 g/cc which is the specific gravity of water. Proppants with a high specific gravity are problematic because the proppants tend to fall to the bottom of the well bore during the fracturing process and therefor may not contribute to improving the conductivity of the well which is not desirable. For most proppants, as the proppant's specific gravity decreases, the proppant's crush resistance also decreases which means that the proppant is weaker. Similarly, as the proppant's specific gravity increases, the proppant's resistance to crushing also increases thereby resulting in a proppant which is stronger. This relationship inherently limits the proppant manufacturer's ability to make a strong proppant with a low specific gravity.

The invention described herein reveals how to use readily available alumina containing ores and a calcium containing compound to engineer proppants which improve the proppant's crush resistance without a corresponding increase in the proppant's specific gravity. The ability to decouple the relationship between specific gravity and crush resistance enables proppant manufacturer's to produce proppants which are stronger and thus more resistant to crushing than proppants made from the same ore without the benefit of the calcium containing compound while maintaining or perhaps reducing the proppant's specific gravity. While this invention may offer the greatest economic advantage when used with inexpensive ores known as "low bauxitic ores" the invention may be used with ores that contain between 25 and 90 weight percent alumina to successfully manufacture sintered proppants on a large scale.

As used herein, the phrase "low bauxitic ores" is defined to mean aluminosilicate ores which have a chemical composition having less than 75 weight percent alumina. In this definition, the word "alumina" refers to the chemical formula $Al_2O_3$, which is determined by x-ray fluorescence (XRF) and not the alumina crystalline phase which is determined by x-ray diffraction (XRD). The chemical composition of the ore may be determined by preparing a fused sample of the ore and then using an x-ray fluorescence (XRF) analytical apparatus to determine the weight percentages of aluminum oxides, iron oxides and silicon oxides. The fused sample may be prepared using a Claisse M4 Fluxer Fusion apparatus (manufactured by Claisse of Quebec City, Canada) as follows. Several grams of the ore are manually ground so that the ore passes through a 75 µm (200 Tyler mesh) sieve. In a platinum crucible supplied by Claisse, 1.0000 g (±0.0005 g) of the ground and screened ore is mixed with 8.0000 g (±0.0005 g) of lithium borates 50-50 which contains a releasing agent such as LiBr or CsI. If the releasing agent is not included in the lithium borate, three drops of a releasing agent (25 w/v % LiBr or CsI) may be added. The mixture in the crucible is then gradually heated in order to remove any organic materials, moisture, etc. Simultaneously, the crucible is rapidly spun so that centrifugal force caused by the spinning drives any entrapped gas from the molten material. When the temperature of the molten ore in the crucible reaches approximately 1000° C., the material has been liquefied and the crucible is tilted so that the molten ore flows into a disc mold. While the molten material is cooling in the disc mold, a fan blows air on the mold to facilitate the removal of heat. As the molten ore cools the material fuses and forms a disc shaped sample that measures approximately 3 cm wide and 4 mm thick. The disc should not contain any gas bubbles trapped therein. The chemical composition of the cooled disc is then determined using a model MagiX Pro Philips X-Ray Fluorescence analyzer running IQ+ software. The same procedure may be used to determine the chemical composition of ceramic particles such as proppants.

While the existence of low bauxitic ores has been well known for many years, these ores were not readily accepted as raw materials for proppants for two reasons. First, proppants made primarily from low bauxitic ores have an alumina content less than 75 weight percent and may have an alumina to silica ratio of 2:1 or lower (i.e. 1.5:1 or 1:1) which is believed to be detrimental to the proppant's crush resistance. Bauxitic ores with higher levels of alumina, such as 75 weight percent or higher, have alumina to silica ratios of 3:1 or higher (i.e. 3.5:1 or 4:1) and typically have better crush resistance than proppants made from low bauxitic ores. Generally speaking, bauxitic ores with both higher levels of alumina and alumina to silica ratios above 2:1 are understood to allow for the production of proppants with better crush resistance than proppants made with low levels of alumina and alumina to silica ratios below 2:1. Second, proppants made from low bauxitic ores may generate cristobalite in situ during the proppant manufacturing process. Cristobalite is a known health hazard and its presence is not acceptable to many proppant consumers and manufacturers. Both of these problems were resolved by combining a low bauxitic ore with a calcium containing compound to form a mixture which was then processed to generate a calcium aluminosilicate compound that includes a calcium containing crystalline phase. Although the exact role of the calcium containing crystalline phase has not been fully established, it is now known to contribute to the improved crush resistance of the proppant and is also now known to prevent the formation of cristobalite. By solving problems which had previously hindered the use of low bauxitic ores, the inventors have made possible the broadest spectrum of bauxitic and aluminosilicate ores as a raw material for sintered proppants.

One embodiment of a non-sintered aluminosilicate particle of the present invention can be made using a process that includes providing a first compound and a second compound that have the following characteristics. The first compound contains between 25 and 90 weight percent $Al_2O_3$, between 0 and 70 weight percent $SiO_2$, 0 to 40 weight percent $Fe_2O_3$ and less than 1 weight percent CaO. The second compound comprises at least 10 weight percent CaO. All percentages are determined using x-ray fluorescence as described above. The first and second compounds are mixed to form a mixture with the first and second compounds uniformly distributed therein. The mixture should comprise at least 5 weight percent CaO. The mixture is then formed into a plurality of non-sintered spherical particles that have a digital thermal analysis that exhibits double exothermal peaks between 800° C. and 1100° C. The non-sintered aluminosilicate particles may also be referred to herein as proppant precursors or greenware.

Suitable first compounds include low bauxitic ores that have between 25 and 75 weight percent alumina. The low bauxitic ore may have less than 65, 60, 55 or even 50 weight percent alumina. More preferably, the low bauxitic ore should have at least 30 weight percent alumina. Even more preferably, the low bauxitic ore should have at least 40 weight percent alumina. With regard to the weight percent silica, the low bauxitic ore should have no more than 70 percent silica. More preferably the low bauxitic ore should have less than 60 weight percent silica. Even more preferably, the low bauxitic ore should have less than 50 weight percent silica. Intermediate values, such 48 and 63 weight percent alumina and 32 and 45 weight percent silica are feasible and contemplated. The quantity of CaO in the low bauxitic ore should be less than 1 weight percent. More preferably the quantity of CaO should be less than 0.5 weight percent or even 0.3 weight percent.

Suitable second compounds are dolomite and limestone. The second compound should comprise at least 10 weight percent CaO as determined by x-ray fluorescence. More preferably the second compound should have at least 50 weight percent CaO and even more preferably at least 75 weight percent CaO.

The first and second compounds may be mixed and formed into a plurality of proppant precursors using an Eirich® R02 mixer which is available from Eirich Machines Inc. of Gurnee, Ill., USA. In addition to the first and second compounds, the mixing procedure may include liquids such as water and sintering aids. The weight ratio of the first compound to the second compound can vary between 10:1 and 1:2. More preferably, the ratio may be between 8:1 and 1:2, or 5:1 and 1:2 or 5:1 and 1:1. Intermediate ratios such as 7.5:2 and 1.7:1 are also possible.

Formed non-sintered aluminosilicate spherical particles of this invention may be characterized by an analytical technique commonly known as differential thermal analysis (DTA). As shown in FIG. 1, line 22 represents a differential thermal analysis of dolomite which is an example of a second compound used in this invention. No peak is disclosed between 800° C. and 1100° C. In FIG. 2, line 24 represents a differential thermal analysis of a low bauxitic ore which is an example of a first compound used in this invention. In FIG. 2, single peak 25 is disclosed between 800° C. and 1100° C. Disclosed in FIG. 3 is a differential thermal analysis of a mixture comprising 75 weight percent of a low bauxitic ore and 25 weight percent dolomite. Line 26 includes first peak 28, which corresponds to a first crystallization temperature, and second peak 30, which corresponds to a second crystallization temperature. Both peaks are located between 800° C. and 1100° C. More specifically, first peak 28 occurred at approximately 950° C., which is the first crystallization temperature, and second peak 30 occurred at approximately 1000° C., which is the second crystallization temperature. Comparing the curves in FIGS. 1, 2 and 3 supports the conclusion that only the mixture of low bauxitic ore and dolomite resulted in the DTA curve having a double peak between 800° C. and 1100° C.

After forming proppant precursors, sintered proppants can be made by heating the proppant precursors to a maximum temperature that is above the non-sintered particle's second crystallization temperature. The sintered aluminosilicate particle may be referred to herein as a proppant.

A proppant of the present invention may have the following chemical and physical characteristics. The chemical composition of the proppant, which is expressed as weight percent of the proppant's ceramic components, may be between 25 and 75 weight percent $Al_2O_3$, between 0 and 70 weight percent $SiO_2$, at least 3 weight percent CaO and at least 5 weight percent of a calcium containing crystalline phase as determined by x-ray diffraction with an internal standard. The calcium containing crystalline phrase comprises at least Ca, Al, Si and O elements in a crystalline structure and could include other elements. The calcium containing crystalline phase may be a calcium aluminosilicate, such as anorthite which can be represented by the chemical formula $CaAl_2Si_2O_8$. Other stoichiometrically similar compounds made from calcium, silicon, aluminum and oxygen are also feasible. The percentage of $Al_2O_3$ may be less than 65, 60, 55 or even 50 weight percent. The quantity of the calcium containing crystalline phase, particularly anorthite, may be at least 10, 20 or even 40 weight percent. Preferably, the quantity of cristobalite will be less than 0.10 weight percent, more preferably less than 0.05 weight percent. In addition to the compounds identified above, the proppant may contain up to 15, 20, 30 or even 40 weight percent $Fe_2O_3$. Various impurities that individually represent less than 10 weight percent, more preferably less than 5 weight percent, of the proppant's ceramic components may also be present.

With regard to the proppant's physical characteristics, its specific gravity may be less than 3.5, 12, 3.0, 2.8 or even 2.6 g/cc. The calcium containing compound's crystalline phase may be triclinic. The structure of the crystalline phase is determined using x-ray diffraction with an internal standard.

Examples

Six lots of proppants, identified herein as Lots A1, A2, B1, B2, C1 and C2 and the processes used to make the proppants will now be described. Shown in Table 1 are: (1) the weight percentages of the first and second compounds used to make the greenware which is a common name of the proppant precursor prior to sintering; (2) the temperatures at which the lots of greenware were sintered; and (3) the quantity of anorthite in the sintered proppant. The quantity of anorthite is based on the weight percent of the proppant as determined by x-ray diffraction using an internal standard.

TABLE 1

| Lot | Ore Type | Ore wt % | Dolomite (wt %) | Sintering Temperature (° C.) | Anorthite (wt %) |
|---|---|---|---|---|---|
| A1 | A | 80 | 20 | 1250 | 50.4 |
| A2 |   | 100 | 0 | 1250 | 0 |
| B1 | B | 75 | 25 | 1350 | 56.8 |
| B2 |   | 100 | 0 | 1350 | 0 |
| C1 | B | 75 | 25 | 1400 | 60.0 |
| C2 |   | 100 | 0 | 1400 | 0 |

Shown in Table 2 are the weight percentages of $Al_2O_3$, $SiO_2$ and $Fe_2O_3$ in ore A and ore B. As used herein, both ore A and ore B are considered to be low bauxitic ores because they comprise less than 75 weight percent alumina.

TABLE 2

| Ore | $Al_2O_3$ | $SiO_2$ | $Fe_2O_3$ |
|---|---|---|---|
| A | 49.4 | 40.3 | 4.9 |
| B | 57.9 | 32.1 | 4.4 |

The proppants of Lot A1 were manufactured using the following method which includes a first sub-process known as "wet forming" and a second sub-process known as "dusting in", In the wet forming sub-process, an 80/20 mixture of type A ore and dolomite, respectively, and approximately two weight percent of a drilling starch binder were disposed into an Eirich® mixer and dry mixed for 30 seconds. As shown in Table 2, ore A included 49.4 weight percent $Al_2O_3$ and 40.3 weight percent $SiO_2$. The quantity of drilling starch was based on the combined weight of just the ore and dolomite. A quantity of water, which was approximately equal to 30 weight percent of just the ore and dolomite, was then added over a 30 second period as the mixer continued to rotate the plurality of spheres which may be referred to herein as "bases". After rotating the bases in the mixer for four more minutes, an additional quantity of the 80/20 mixture of just ore and dolomite was slowly added to the mass of rotating bases by sprinkling (also known as "dusting in") the 80/20 mixture onto the rotating bases thereby coating a layer of the 80/20 mixture on top of each base formed during the wet forming process. The coated bases, which may be referred to herein as greenware, were then sintered at 1250° C. As shown in Table 1, the proppants of Lot A1 included 50.4 weight percent anorthite.

The proppants of Lot A2 were formed using the same process that was used to form the proppants of Lot A1 except that the proppants in Lot A2 did not include any dolomite. The mixture from which the greenware in Lot A2 was made included ore A, starch and water. In contrast to the proppants in Lot A1, the proppants in Lot A2 did not have any anorthite formed therein.

The proppants in Lot B1 were also formed using the process that was used to form the proppants of Lot A1 except that the proppants in Lot B1 were made from a 75/25 mixture of type B ore and dolomite, respectively, and the sintering temperature was 1350° C. As shown in Table 2, ore B included 57.9 weight percent $Al_2O_3$ and 32.1 weight percent $SiO_2$. As shown in Table 1, the proppants of Lot B1 included 56.8 weight percent anorthite.

The proppants of Lot B2 were formed using the process that was used to form the proppants of Lot B1 except that the proppants in Lot B2 did not include any dolomite. The mixture from which the greenware in Lot B2 was made included ore B, starch and water. In contrast to the proppants in Lot B1, the proppants in Lot B2 did not have any anorthite formed therein.

The proppants in Lot C1 were formed using the same materials and process that were used to form the proppants of Lot B1 except that the proppants of Lot C1 were sintered at 1400° C. As shown in Table 1, the proppants of Lot C1 included 60.0 weight percent anorthite.

The proppants in Lot C2 were formed using the same materials and process that were used to form the proppants of Lot B2 except that the proppants of Lot C2 were sintered at 1400° C. As shown in Table 1, the proppants of Lot C2 did not have any anorthite formed therein.

Shown below in Table 3 are the specific gravity and crush resistance of Lots C1 and C2.

TABLE 3

| Lot | Specific Gravity (g/cc) | Crush Resistance* (weight percent) |
|---|---|---|
| C1 | 2.75 | 7.8 |
| C2 | 2.91 | 15.6 |

*Crush resistance was determined at a pressure of 55.1 MPa (8,000 psi).

The data in Table 1 provides three sets of comparative examples (i.e. A1 vs A2, B1 vs B2 and C1 vs C2) which demonstrates that the inclusion of dolomite in the mixture used to form the greenware resulted in the formation of anorthite which is a calcium containing crystalline phase. The formation of anorthite occurred at three different sintering temperatures, while using two distinct ores and two different percentages of dolomite. The data in Table 3 supports the conclusion that the addition of anorthite, which enabled the formation of the calcium containing crystalline phase in the proppant, resulted in an unexpected 50 percent decrease in crush resistance, from 15.6 wt % to 7.8 wt %, despite a reduction in specific gravity from 2.91 glee to 2.75 g/cc. The ability to improve crush resistance while also reducing the proppant's specific gravity is a significant technical achievement which is believed to be a valuable tool in the production of commercially viable proppants.

To utilize a proppant of this invention, a plurality of proppants may be mixed with conventional fracturing fluids thereby forming a slurry which may then be injected through a well bore and subsequently into fissures in a geological formation. The specific gravity of the proppants and the specific gravity of the fracturing fluid are selected to minimize settling of the proppant to the bottom of the well bore prior to the completion of the pressurized injection process. The slurry is defined herein as a suspension.

An apparatus for fracturing a geological formation may be used to forcefully inject the suspension downhole and force the proppants and fluid into fissures in the earth. The apparatus may include a means for boring both a vertical shaft, known as a well bore, and then horizontal openings into the geological formation. The means for boring may include a drill bit connected to a fixed, jointed or flexible shaft which is rotated by a power source. After the vertical shaft and optional horizontal openings have been completed and the boring means has been withdrawn, the apparatus may use a pump or functionally similar means to force the suspension comprising a proppant of this invention through the shaft and then into the earth. The apparatus may also include a means for mixing the proppant with the fracturing fluid thereby generating the suspension near the site of the well bore and just prior to inserting the suspension into the well bore. The apparatus may also include a means for removing the fracturing fluid from the well.

The above description is considered that of particular embodiments only. Modifications of the invention will occur to those skilled in the art and to those who make or use the invention. Therefore, it is understood that the embodiments described above are merely for illustrative purposes and are not intended to limit the scope of the invention, which is defined by the following claims.

What is claimed is:

1. A proppant for use in fracturing geological formations, said proppant comprising:
   a. between 25 and 55 weight percent $Al_2O_3$, between 0 and 70 weight percent $SiO_2$, at least 3 weight percent CaO, wherein all percentages are determined by x-ray fluorescence; and
   b. at least 5 weight percent of a calcium containing crystalline phase as determined by x-ray diffraction with an internal standard.

2. The proppant of claim 1 having a specific gravity less than 3.5 g/cc.

3. The proppant of claim 1 wherein said calcium containing crystalline phase is anorthite.

4. The proppant of claim 1 wherein said proppant comprises less than 50 weight percent $Al_2O_3$.

5. The proppant of claim 1 wherein said proppant comprises between 0 and 40 weight percent $Fe_2O_3$.

6. The proppant of claim 1 wherein said proppant comprises between 0 and 30 weight percent $Fe_2O_3$.

7. The proppant of claim 1 wherein said proppant comprises between 0 and 20 weight percent $Fe_2O_3$.

8. The proppant of claim 1 wherein said proppant comprises between 0 and 15 weight percent $Fe_2O_3$.

9. The proppant of claim 1 wherein said proppant comprises at least 10 weight percent of said calcium containing crystalline phase.

10. The proppant of claim 1 wherein said proppant comprises at least 20 weight percent of said calcium containing crystalline phase.

11. The proppant of claim 3 wherein said proppant comprises at least 10 weight percent anorthite.

12. The proppant of claim 3 wherein said proppant comprises at least 20 weight percent anorthite.

13. The proppant of claim 3 wherein said proppant comprises at least 40 weight percent anorthite.

14. The proppant of claim 1 wherein said specific gravity does not exceed 3.2 g/cc.

15. The proppant of claim 1 wherein said specific gravity does not exceed 3.0 g/cc.

16. The proppant of claim 1 wherein said specific gravity does not exceed 2.8 g/cc.

17. The proppant of claim 1 wherein said specific gravity does not exceed 2.6 g/cc.

18. The proppant of claim 1 further comprises less than 0.10 weight percent cristobalite.

19. The proppant of claim 1 further comprises less than 0.05 weight percent cristobalite.

20. A proppant for use in fracturing geological formations, said proppant comprising:

a. between 25 and 75 weight percent $Al_2O_3$, between 0 and 70 weight percent $SiO_2$, at least 3 weight percent CaO, wherein all percentages are determined by x-ray fluorescence;
b. at least 5 weight percent of a calcium containing crystalline phase as determined by x-ray diffraction with an internal standard; and
c. a specific gravity that does not exceed 2.8 g/cc.

21. The proppant of claim 20 wherein said calcium containing crystalline phase is anorthite.

22. The proppant of claim 20 wherein said proppant comprises less than 70 weight percent $Al_2O_3$.

23. The proppant of claim 20 wherein said proppant comprises less than 65 weight percent $Al_2O_3$.

24. The proppant of claim 20 wherein said proppant comprises less than 60 weight percent $Al_2O_3$.

25. The proppant of claim 20 wherein said proppant comprises less than 55 weight percent $Al_2O_3$.

26. The proppant of claim 20 wherein said proppant comprises less than 50 weight percent $Al_2O_3$.

27. The proppant of claim 20 wherein said proppant comprises between 0 and 40 weight percent $Fe_2O_3$.

28. The proppant of claim 20 wherein said proppant comprises between 0 and 30 weight percent $Fe_2O_3$.

29. The proppant of claim 20 wherein said proppant comprises between 0 and 20 weight percent $Fe_2O_3$.

30. The proppant of claim 20 wherein said proppant comprises between 0 and 15 weight percent $Fe_2O_3$.

31. The proppant of claim 20 wherein said proppant comprises at least 10 weight percent of said calcium containing crystalline phase.

32. The proppant of claim 20 wherein said proppant comprises at least 20 weight percent of said calcium containing crystalline phase.

33. The proppant of claim 21 wherein said proppant comprises at east 10 weight percent anorthite.

34. The proppant of claim 21 wherein said proppant comprises at least 20 weight percent anorthite.

35. The proppant of claim 21 wherein said proppant comprises at least 40 weight percent anorthite.

36. The proppant of claim 20 wherein said specific gravity does not exceed 2.6 g/cc.

37. The proppant of claim 20 further comprises less than 0.10 weight percent cristobalite.

38. The proppant of claim 20 further comprises less than 0.05 weight percent cristobalite.

* * * * *